(12) United States Patent
Parks

(10) Patent No.: US 9,352,495 B1
(45) Date of Patent: May 31, 2016

(54) BARRIER RELEASE AGENT

(75) Inventor: Hiram Sultan Parks, Owings Mills, MD (US)

(73) Assignee: HSP Holdings, LLC, Owings Mills, MD (US)

( * ) Notice: Subject to any disclaimer, the term of this patent is extended or adjusted under 35 U.S.C. 154(b) by 803 days.

(21) Appl. No.: 13/420,419

(22) Filed: Mar. 14, 2012

Related U.S. Application Data

(60) Provisional application No. 61/464,998, filed on Mar. 14, 2011.

(51) Int. Cl.
| | |
|---|---|
| *B29C 33/56* | (2006.01) |
| *B29C 33/60* | (2006.01) |
| *B29C 33/62* | (2006.01) |
| *B29C 33/66* | (2006.01) |

(52) U.S. Cl.
CPC ............... *B29C 33/66* (2013.01); *B29C 33/56* (2013.01); *B29C 33/60* (2013.01); *B29C 33/62* (2013.01)

(58) Field of Classification Search
None
See application file for complete search history.

(56) References Cited

U.S. PATENT DOCUMENTS

| | | | |
|---|---|---|---|
| 8,008,242 B1 * | 8/2011 | Imam et al. ............... | 510/395 |
| 2004/0016053 A1 * | 1/2004 | Takahata et al. ........... | 4/661 |
| 2004/0185011 A1 * | 9/2004 | Alexander et al. ......... | 424/49 |
| 2006/0073186 A1 * | 4/2006 | Kume et al. ............... | 424/439 |
| 2007/0020304 A1 * | 1/2007 | Tamarkin et al. .......... | 424/405 |
| 2013/0053603 A1 * | 2/2013 | Norstrom et al. .......... | 564/63 |

FOREIGN PATENT DOCUMENTS

JP     2009039069 A   *   2/2009

OTHER PUBLICATIONS

JP 2009039069 English Abstract from PAJ.*

* cited by examiner

*Primary Examiner* — Colin W Slifka
(74) *Attorney, Agent, or Firm* — Rahman LLC

(57) ABSTRACT

An active barrier release agent includes a combination mixture of sodium borate, sodium hydroxide, methylhydroxyethylcellulose, psyllium husk, corn fiber, and water. Acacia powder may also be added to the mixture.

15 Claims, 1 Drawing Sheet

---

DISSOLVING METHYLHYDROXYETHYLCELLULOSE, PSYLLIUM HUSK, AND CORN FIBER IN WATER TO CREATE A FIRST SUB-MIXTURE. — 101

↓

DISSOLVING SODIUM BORATE AND SODIUM HYDROXIDE IN WATER TO CREATE A SECOND SUB-MIXTURE. — 103

↓

COMBINING THE FIRST SUB-MIXTURE WITH THE SECOND SUB-MIXTURE TO CREATE A BARRIER RELEASE MIXTURE. — 105

↓

HEATING THE BARRIER RELEASE MIXTURE. — 107

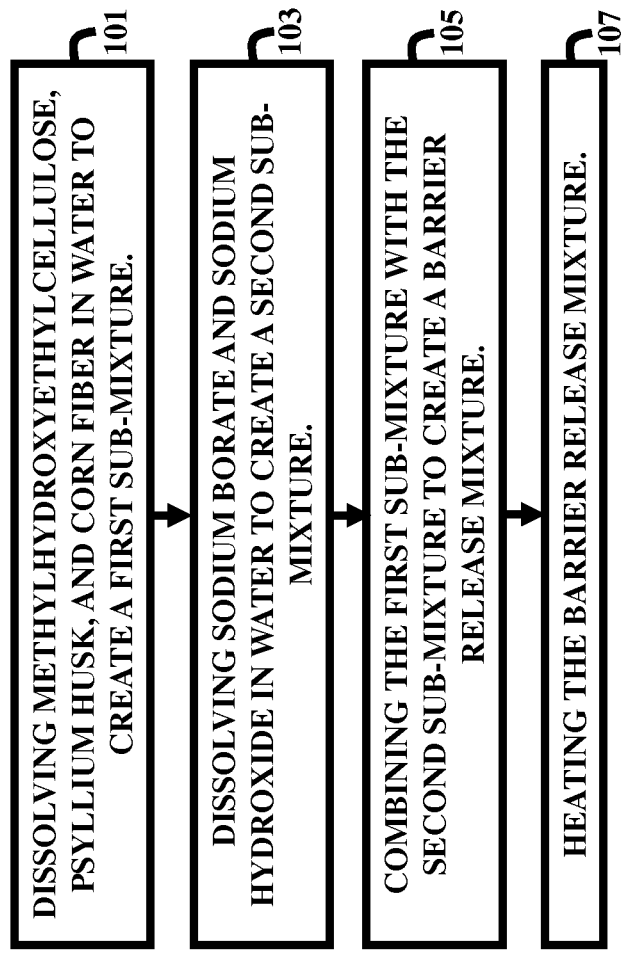

BARRIER RELEASE AGENT

CROSS-REFERENCE TO RELATED APPLICATIONS

This application claims priority to U.S. Provisional Patent Application Ser. No. 61/464,998 filed on Mar. 14, 2011, the complete disclosure of which, in its entirety, is herein incorporated by reference.

BACKGROUND

1. Technical Field

The embodiments herein generally relate to surface release agents, and, more particularly, to water-based surface release agents that impede bonding of other materials to the surface of a structure or material.

2. Description of the Related Art

Conventional barrier release agents are typically applied to the surface of a primary structure or material to prevent the adhesion of other materials that may come in contact with the primary structure or material. Generally, barrier release agents are embodied as a film or chemical barrier that is formed on the surface of the primary structure or material. Typical barrier release agents are oil-based to take advantage of the viscous properties of oil. Some barrier release agents are chemically active in that they chemically combine with a suitable and corresponding chemical or ingredient in the primary structure or material.

Alternatively, other barrier release agents are chemically inactive and serve merely as a separate and distinct barrier on the primary structure or material. Unfortunately, conventional oil-based barrier release agents are generally environmentally unfriendly, and could be potentially hazardous depending on the ambient conditions surrounding the area of use of the barrier release agent. Furthermore, non oil-based conventional barrier release agents, which are water-based, are often limited to the types of structures or materials with which they can be applied or bonded based on the chemistry of the structures or materials and the corresponding chemistry of the particular barrier release agent that is selected.

Additionally, conventional water-based barrier release agents typically have a 20:1 ratio for mixing with water. In other words, one part of concentrated water-based barrier release agent can be mixed with 20 parts of water to create a bulk mixture. Nonetheless, there remains a need in the industry for a barrier release agent that is environmentally sound, safe, and is easily applicable on a wide range of structures and materials.

SUMMARY

In view of the foregoing, an embodiment herein provides an active barrier release agent comprising a combination mixture of sodium borate, sodium hydroxide, methylhydroxyethylcellulose, psyllium husk, corn fiber, and water. In one embodiment, the mixture may include less than 3% of the sodium borate by weight, less than 2% of the sodium hydroxide by weight, less than 2% of the methylhydroxyethylcellulose by weight, less than 2% of the psyllium husk by weight. The mixture may also include less than 2% of acacia powder by weight.

Another embodiment provides a method of preparing a barrier release mixture, the method comprising combining sodium borate, sodium hydroxide, methylhydroxyethylcellulose, and psyllium husk with water. The method may also include adding corn fiber to the barrier release mixture. Additionally, the method may include adding acacia powder to the barrier release mixture. The method also includes dissolving (for example, by heating) the methylhydroxyethylcellulose, the psyllium husk, the acacia powder, and the corn fiber in a first portion of the water to create a first sub-mixture. The method further includes dissolving the sodium borate and the sodium hydroxide in a second portion of the water to create a second sub-mixture. The method also includes combining the first sub-mixture with the second sub-mixture to create the barrier release mixture. Finally, the method includes heating the barrier release mixture.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWING

The embodiments herein will be better understood from the following detailed description with reference to the drawing, in which:

FIG. 1 is a flow diagram illustrating a method according to an embodiment herein.

DETAILED DESCRIPTION

The embodiments herein and the various features and advantageous details thereof are explained more fully with reference to the non-limiting embodiments that are illustrated in the accompanying drawing and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide an active water-based barrier release agent that is environmentally sound and equally applicable to a wide range of surfaces. Moreover, the embodiments herein create a barrier on surfaces of a structure or material that impedes the bonding process of any bonding agents that are subsequently applied to the structure or material.

The embodiments herein provide an active barrier release agent comprising a combination mixture of sodium borate, sodium hydroxide, methylhydroxyethylcellulose, psyllium husk, corn fiber, and water. In one embodiment, the mixture includes less than 3% of the sodium borate by weight, less than 2% of the sodium hydroxide by weight, less than 2% of the methylhydroxyethylcellulose by weight, less than 2% of the psyllium husk by weight, and greater than 90% of water by weight. In another embodiment, the mixture also includes less than 2% of acacia powder by weight.

In another embodiment, the mixture may include approximately 0.5 to 4% of the sodium borate by weight, 0.2 to 2% of the sodium hydroxide by weight, 0.2 to 2% of the methylhydroxyethylcellulose by weight, and 0.2 to 2% of the psyllium husk by weight. In still another embodiment the mixture may include 0.2 to 2% of acacia powder by weight.

The components of the mixture are bio-degradable, non-staining, non-dusting, non-flammable, and non-reactive. Furthermore, the embodiments herein comprise a 32:1 ratio for mixing with water. In other words, one part of concentrated mixture can be mixed with 32 parts of water to create a bulk and effective mixture. The 32:1 ratio is significantly higher than the industry standard of 20:1 for water-based barrier release agents. Additionally, the ingredients of the mixture are easily and relatively cheaply accessible thereby making the mixture economical to manufacture and purchase. In operation, a user adequately wets the surface to be protected, and the mixture creates a barrier over the micro pores on the surface. This effectively prevents bonding to the surface by any other material, epoxy, load, ice, etc. The mixture can be reconstituted with water and works on all levels and types of asphalt with polymers thereby overcoming the limitations of the conventional mixtures and solutions. Because the mixture provided by the embodiments herein is water-based (i.e., non-oil/petroleum based), it is environmentally safer than conventional petroleum-based barrier release agents.

Generally, the mixture provided by the embodiments herein can be coated onto surfaces to prevent unwanted sticking of any other substance that can bond to the respective surface. Generally, the mixture cures instantaneously. Upon curing, the mixture becomes a film that is generally transparent unless it is applied to glass, where it is slightly opaque. The film is removable, and can be removed by a surfactant and water. The embodiments herein may be used on numerous applications including, but not limited to, concrete, asphalt, as an anti-fouling agent for marine vessels, as an encapsulant, concrete forms and mold releases, epoxy releases, anti-icing and frozen loads, rust inhibitors, wet soils, clays, particulate silica, resisting barnacles, and a dump truck bed release, among other uses.

Table 1 lists some of the material properties associated with the mixture provided by the embodiments herein. Furthermore, Example 1 is provided to describe a sample mixture which may be used and manufactured in accordance with the embodiments herein. Example 1 is only a representative sample of the relative concentrations of the ingredients which may be used in accordance with the embodiments herein, and the embodiments herein are not limited to the amounts indicated in Example 1. Moreover, Example 1 indicates a concentrated mixture combination, whereby the overall mixture may be further diluted by adding additional water (e.g., in accordance with the 32:1 concentrate-to-water ratio described above).

Table 1: Sample Material Properties
Property Value
Volatility 0%
Solubility in Water 100%
Odor None
Appearance and Color off-white liquid[1],[2]
Melting/Freezing Point 32° F. (0° C.)
Boiling Point 212° F. (100° C.)
pH 5-7

(1) When concentrated, the mixture comprises a clear golden orange color, and is substantially completely clear when further diluted with water at a 32:1 ratio.
(2) Dyes may be added to change the color of the mixture, if desired. This may occur at the time of manufacturing or by the user.

Example 1

Sample Mixture

Ingredients for approximately 1½ gallon of the concentrated mixture:

Tap water—1½ gallon (approximately 5.7 kilograms)
Methylhydroxyethylcellulose powder—approximately 15 grams
Sodium hydroxide powder—approximately 15 grams
Sodium borate powder—approximately 224 grams
Corn fiber (approximately 70% dietary fiber)—approximately 15 grams
Corn fiber (approximately 85% dietary fiber)—approximately 15 grams
*Psyllium* husk powder—approximately 15 grams To create the barrier release mixture, the sodium hydroxide powder and sodium borate powder are mixed with approximately ½ gallon of water until fully dissolved, which can take approximately 1-2 hours. Separately, approximately ½ gallon of water is mixed with the methylhydroxyethylcellulose, corn fiber (70%), corn fiber (85%), and psyllium husk powder over low heat at approximately 175-189° F. or until the mixture boils. In an alternative embodiment, approximately 15 grams of acacia powder may be added to the methylhydroxyethylcellulose, corn fiber (70%), corn fiber (85%), psyllium husk powder, and water sub-mixture. Next, when the heated sub-mixture fully dissolves in the water, the dissolved sodium hydroxide and sodium borate sub-mixture along with another ½ gallon of water is added and the entire mixture is heated over low heat at approximately 175-189° F. or until the mixture boils, which may be approximately 15 minutes. The mixture may be continuously stirred until it thickens. Thereafter, the entire mixture is allowed to cool and is ready to use.

FIG. 1 is a flow diagram illustrating a method of preparing a barrier release mixture according to an embodiment herein, the method generally comprising combining sodium borate, sodium hydroxide, methylhydroxyethylcellulose, and psyllium husk with water. Specifically, the method includes dissolving (101) the methylhydroxyethylcellulose, psyllium husk, and corn fiber in a first portion of the water to create a first sub-mixture. In an alternative embodiment, acacia powder may also be dissolved in the first sub-mixture. The method also includes dissolving (103) the sodium borate and sodium hydroxide in a second portion of the water to create a second sub-mixture. Next, the method includes combining (105) the first sub-mixture with the second sub-mixture to create the barrier release mixture. Finally, the method includes heating (107) the barrier release mixture.

The mixture may be applied to a surface by brush, rag, roller, low pressure sprayer, aerosol, or simply by pouring it on the surface. Moreover, the surface on which the mixture is applied may be paintable (i.e., the mixture is paintable once it cures on the surface). Furthermore, excess mixture or spills may be funneled back into the original container holding the mixture. The mixture dries clear and can be applied in hot or cold weather. The overall mixture may be stored at room temperature and has an indefinite shelf life when properly sealed.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A non-flammable liquid mixture comprising sodium borate, sodium hydroxide, methylhydroxyethylcellulose, psyllium husk, water, acacia powder, and corn fiber, wherein said corn fiber comprises multiple concentrations of dietary fiber.

2. The mixture of claim 1, further comprising less than 3% of said sodium borate by weight.

3. The mixture of claim 1, further comprising less than 2% of said sodium hydroxide by weight.

4. The mixture of claim 1, further comprising less than 2% of said methylhydroxyethylcellulose by weight.

5. The mixture of claim 1, further comprising less than 2% of said psyllium husk by weight.

6. The mixture of claim 1, wherein said multiple concentrations of dietary fiber comprise:
a first corn fiber concentration comprising at least 70% dietary fiber; and
a second corn fiber concentration comprising at least 85% dietary fiber.

7. The mixture of claim 1, wherein said mixture cures as a substantially clear film that is paintable.

8. A barrier release agent comprising a combination of sodium borate, sodium hydroxide, methylhydroxyethylcellulose, psyllium husk, water, acacia powder, and corn fiber, wherein said barrier release agent is non-staining and cures from a liquid to a substantially clear film that is paintable.

9. The barrier release agent of claim 8, further comprising less than 3% of said sodium borate by weight.

10. The barrier release agent of claim 8, further comprising less than 2% of said sodium hydroxide by weight.

11. The barrier release agent of claim 8, further comprising less than 2% of said methylhydroxyethylcellulose by weight.

12. The barrier release agent of claim 8, further comprising less than 2% of said psyllium husk by weight.

13. The barrier release agent of claim 8, further comprising sodium borate and said sodium hydroxide.

14. The barrier release agent of claim 8, wherein said corn fiber comprises multiple concentrations of dietary fiber.

15. The barrier release agent of claim 14, wherein said multiple concentrations of dietary fiber comprise:
a first corn fiber concentration comprising at least 70% dietary fiber; and
a second corn fiber concentration comprising at least 85% dietary fiber.

* * * * *